UNITED STATES PATENT OFFICE.

HENRY WILLIAM HEMINGWAY, OF LONDON, ENGLAND.

PROCESS OF STRIPPING TIN FROM TINNED IRON AND RECOVERING THE METALS.

SPECIFICATION forming part of Letters Patent No. 663,024, dated December 4, 1900.

Application filed May 7, 1900. Serial No. 15,820. (No specimens.)

*To all whom it may concern:*

Be it known that I, HENRY WILLIAM HEMINGWAY, a subject of the Queen of Great Britain and Ireland, residing at Albyns, Forest road, Walthanstow, London, in the county of Essex, England, have invented a new and useful Improved Process for Use in Stripping the Tin from Tinned Iron and Recovering the Respective Metals, of which the following is a specification.

This invention relates to an improved process for stripping the tin from tinned-iron clippings and similar waste with a view to the recovery of the tin as also of the stripped iron or steel.

In carrying out my improved process I employ persulfate of iron to dissolve the tin, and thus to remove it from the iron, and I continue to add further quantities of the tinned-iron clippings until the persulfate has been converted into protosulfate. Upon this stage being reached, the tin deposits itself as an oxid, some insoluble persulfate of iron being thrown down at the same time. The precipitate may then be dried and the tin separated by smelting or by chemical means from the ferric salts.

A solution of persulfate of iron is known as a powerful oxidizing agent; but the essential feature of my invention consists in its use as a solvent of tin, the continued application of tinned iron or even iron to such a solution having the effect of exhausting the oxygen, converting the persulfate into a protosulfate, and throwing down the tin as a precipitate.

The following formula illustrates the reactions which occur:

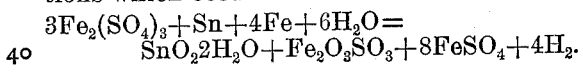

It may, however, be observed that the proportion which may happen to prevail between the persulfate of iron and the metal, as also the proportion of the one metal to the other, will entail modifications in the terms of the equation. Difference in the temperature at which the operation is conducted will also occasion a larger or smaller quantity of the persulfate of iron to be precipitated, the formula undergoing corresponding variations.

Should it be desired to diminish the tendency of the persulfate of iron to precipitate with the oxid of tin, sulfuric acid may be added to the solution of persulfate of iron. Under such circumstances the persulfate of iron, when reduced to protosulfate, ceases to act on the tin, and stripped or other available iron may be added to take up the acid, and thus allow the oxid of tin to precipitate. A similar result may be accomplished by adding sulfid of iron to the tin-charged solution of sulfate of iron. In this case a reaction takes place, the added iron going into solution, while the tin is precipitated as sulfid.

What I claim as my invention, and desire to secure by Letters Patent, is—

The herein-described process for stripping tin from tinned iron and recovering the tin, consisting in treating the tinned iron with a solution of persulfate of iron, continuing to add iron until the persulfate is converted into protosulfate and the tin thrown down as a precipitate, collecting the latter and recovering the tin therefrom.

HENRY WILLIAM HEMINGWAY.

Witnesses:
F. F. PALMER,
W. H. DORMER.